United States Patent
Gong et al.

(10) Patent No.: US 8,971,351 B2
(45) Date of Patent: Mar. 3, 2015

(54) ENHANCED CARRIER SENSING FOR MULTI-CHANNEL OPERATION

(75) Inventors: Michelle X. Gong, Sunnyvale, CA (US); Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/568,563

(22) Filed: Aug. 7, 2012

(65) Prior Publication Data

US 2012/0300707 A1 Nov. 29, 2012

Related U.S. Application Data

(63) Continuation of application No. 12/748,678, filed on Mar. 29, 2010, now Pat. No. 8,259,745.

(51) Int. Cl.
*H04L 12/413* (2006.01)
*H04W 74/08* (2009.01)
*H04L 1/00* (2006.01)

(52) U.S. Cl.
CPC .......... *H04W 74/0816* (2013.01); *H04L 1/0061* (2013.01)
USPC .......................................... 370/445; 370/329

(58) Field of Classification Search
CPC ..... H04W 28/18; H04W 28/26; H04L 12/417
USPC .......... 370/328–329, 335–336, 338, 342–343, 370/345–346, 348, 441–442, 445, 447–450, 370/458–459, 461–462, 437
See application file for complete search history.

(56) References Cited

U.S. PATENT DOCUMENTS

| | | | | |
|---|---|---|---|---|
| 6,404,756 B1 * | 6/2002 | Whitehill et al. | ............. | 370/338 |
| 7,075,890 B2 | 7/2006 | Ozer et al. | | |
| 7,817,609 B2 | 10/2010 | Law et al. | | |
| 7,881,277 B2 * | 2/2011 | Hyon et al. | ................... | 370/348 |
| 7,995,604 B2 * | 8/2011 | Rofougaran | ................... | 370/445 |
| 8,199,723 B2 * | 6/2012 | Li et al. | .......... | 370/334 |
| 8,374,080 B2 * | 2/2013 | Chu et al. | ...................... | 370/229 |
| 8,451,749 B2 | 5/2013 | Tanaka et al. | | |
| 8,451,771 B2 * | 5/2013 | Hedayat et al. | ................ | 370/322 |
| 8,493,868 B2 * | 7/2013 | Nguyen et al. | ................ | 370/236 |
| 8,605,692 B2 * | 12/2013 | Kim et al. | ...................... | 370/338 |
| 8,730,905 B2 * | 5/2014 | Kneckt et al. | ................. | 370/330 |

(Continued)

FOREIGN PATENT DOCUMENTS

| | | |
|---|---|---|
| EP | 1298848 | 4/2003 |
| EP | 1708382 | 10/2006 |

(Continued)

OTHER PUBLICATIONS

International Search Report received for PCT Patent Application No. PCT/US2011/030261, mailed Nov. 1, 2011, 4 pgs.

(Continued)

*Primary Examiner* — Kevin Mew
(74) *Attorney, Agent, or Firm* — Kacvinsky Daisak Bluni PLLC

(57) ABSTRACT

In various embodiments, a multi-channel request-to-send and a multi-channel clear-to-send may be used in a wireless communications network to assure that a subsequent multi-channel communications exchange between two devices takes place only over channels that are sensed by both devices as being free.

42 Claims, 4 Drawing Sheets

(56) References Cited

U.S. PATENT DOCUMENTS

| | | | |
|---|---|---|---|
| 2002/0019880 A1 | 2/2002 | Sakakura | |
| 2003/0058886 A1 | 3/2003 | Stanforth et al. | |
| 2005/0058151 A1* | 3/2005 | Yeh | 370/445 |
| 2006/0077942 A1 | 4/2006 | Panwar et al. | |
| 2006/0209772 A1* | 9/2006 | Fang et al. | 370/338 |
| 2006/0256737 A1 | 11/2006 | Choi et al. | |
| 2007/0016719 A1 | 1/2007 | Ono et al. | |
| 2007/0064721 A1* | 3/2007 | Garcia-Luna-Aceves | 370/445 |
| 2007/0124443 A1 | 5/2007 | Nanda et al. | |
| 2007/0225044 A1 | 9/2007 | Law et al. | |
| 2007/0297353 A1 | 12/2007 | Habetha et al. | |
| 2008/0130591 A1 | 6/2008 | Kwon | |
| 2008/0160925 A1* | 7/2008 | Rofougaran | 455/73 |
| 2008/0192707 A1 | 8/2008 | Xhafa et al. | |
| 2009/0010275 A1* | 1/2009 | Diepstraten et al. | 370/445 |
| 2009/0016263 A1 | 1/2009 | Kishigami et al. | |
| 2009/0279514 A1 | 11/2009 | Seok | |
| 2009/0296669 A1 | 12/2009 | Uchiyama et al. | |
| 2010/0054230 A1 | 3/2010 | Sridhara et al. | |
| 2010/0177757 A1 | 7/2010 | Kim et al. | |
| 2010/0246399 A1 | 9/2010 | Abraham et al. | |
| 2011/0064013 A1 | 3/2011 | Liu et al. | |
| 2012/0044844 A1* | 2/2012 | Trainin | 370/310 |

FOREIGN PATENT DOCUMENTS

| | | |
|---|---|---|
| JP | 2002111672 | 4/2002 |
| JP | 2003-319449 | 11/2003 |
| JP | 2003-348641 | 12/2003 |
| JP | 2006094320 | 4/2006 |
| KR | 10-2008-0083085 | 9/2008 |
| KR | 10-2008-0102069 | 11/2008 |
| WO | 2004109473 | 12/2004 |
| WO | 2009093404 | 7/2009 |

OTHER PUBLICATIONS

Office Action received for Japanese Patent Application No. 2011-070171, mailed Aug. 28, 2012, 4 pgs. including 2 pgs. English translation.

Office Action received for Chinese Patent Application No. 201110124432.X, mailed May 2, 2013, 20 pages including 13 pages English translation.

Office Action received for Japanese Patent Application No. 2011-070171, mailed Apr. 16, 2013, pages including 13 pages English translation.

Office Action received for Japanese Patent Application No. 2011-070171, mailed Dec. 10, 2013, 2 pages English translation.

Office Action received for Japanese Patent Application No. 2013168490, mailed Apr. 30, 2014, 4 pages including 2 pages English translation.

Office Action received for Japanese Patent Application No. 2011-70171, mailed Aug. 19, 2014, 13 pages including 4 pages English translation.

Office Action received for Chinese Patent Application No. 2011-70171, mailed Aug. 1, 2014, 21 pages including 4 pages English translation.

* cited by examiner

MRTS

| Frame control | Duration | RA | TA | Channel bitmap | FCS |

FIG. 3

MCTS

| Frame control | Duration | RA | Channel bitmap | FCS |

FIG. 4

ENHANCED CARRIER SENSING FOR MULTI-CHANNEL OPERATION

BACKGROUND

For wireless communications networks operating under various standards, a device may sometimes transmit simultaneously over multiple channels, therefore increasing the amount of data that may be transmitted in a specified time period. Before making such a multi-channel transmission, a device may sense whether any of those narrow channels are currently busy. However, a channel that is sensed as free by the intended transmitter may be sensed as busy by the intended receiver due to the so-called hidden node problem (for example, a receiver at the edge of the current network may be able to hear signals from a device in a neighboring network that aren't strong enough to reach the transmitter of the current network). If the transmitter goes ahead and transmits because it isn't aware of that hidden node, the receiver may not be able to correctly receive the transmission due to interference from the neighboring device on any of those channels. Networks that exclusively use a single channel for communication may use a Request-to-Send/Clear-to-Send (RTS/CTS) exchange for avoiding the hidden-node problem, but in these exchanges both RTS and CTS are transmitted on a single channel. If the interfering signal is on one of the other channels that are contained in the transmission, the transmitter will not be aware of it and will transmit a signal that probably won't be received.

BRIEF DESCRIPTION OF THE DRAWINGS

Some embodiments of the invention may be understood by referring to the following description and accompanying drawings that are used to illustrate embodiments of the invention. In the drawings:

FIG. 3 shows the format of an MRTS, according to an embodiment of the invention.

FIG. 4 shows the format of an MCTS, according to an embodiment of the invention.

DETAILED DESCRIPTION

Figure 1:
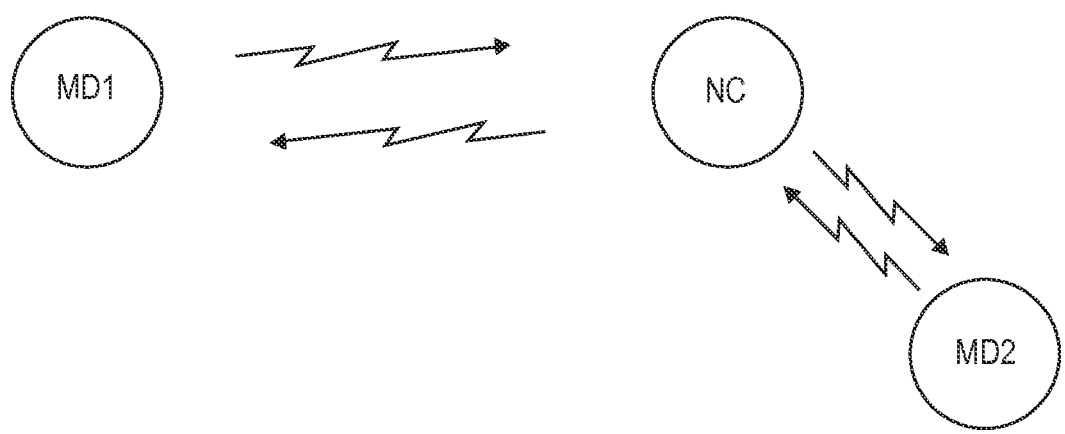
FIG. 1 shows wireless devices communicating with each other in a wireless communications network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. A wireless device may comprise at least one antenna, at least one radio, and at least one processor, where the radio's transmitter transmits signals through the antenna that represent data and the radio's receiver receives signals through the antenna that represent data, while the processor may process the data to be transmitted and the data that has been received. The processor may also process other data which is neither transmitted nor received.

The term "network controller" (NC) is intended to mean a device that schedules and controls, at least partially, wireless communications by other devices in the network. A network controller may also be known as a base station (BS), access point (AP), central point (CP), or any other term that may arise to describe the functionality of a network controller. In a multi-channel network, a number of channels may generally be available to use for communications between devices in the network. These available channels may be specified by industry standard, by government regulations, by the limitations of the network devices themselves, or through any other feasible means. Of the available channels, the NC may select which ones may be used in a specific communication between two specific devices in the network. The NC may change this selection from time to time as it deems appropriate.

The term "mobile device" (MD) is intended to mean a device whose wireless communications are at least partially scheduled and controlled by the network controller. A mobile device may also be known as a mobile node, a STA, a subscriber station (SS), user equipment (UE), or any other term that may arise to describe the functionality of a mobile device. Mobile devices may move during such communications, but movement is not required.

The term "free channel" is intended to mean a channel that has been determined as not being in use, as sensed by the device making the determination, and therefore may be available for use by that device. In various embodiments, the determination may be made by monitoring the amount of electromagnetic energy sensed on that channel, by trying to decode data that has been encoded on that channel, or by any other feasible means that would indicate that the sensing device could use the channel for communications without a high, likelihood of interference. In some situations, when two devices are to communicate with each other, it is possible that one device may sense a channel as free but the other device will sense the channel as busy, because of their relative distances from the device that is already using that channel.

The term multi-channel request-to-send (MRTS) is intended to mean a request-to-send (RTS) that requests a reservation for multiple channels. A multi-channel clear-to-send (MCTS) is intended to mean a clear-to-send (CTS) that agrees to a reservation for one or more multiple channels in response to an MRTS. Just as an RTS/CTS exchange may be used to reserve a single channel, an MRTS/MCTS exchange may be used to reserve multiple channels for the same period of time.

In various embodiments, a first wireless device may transmit an MRTS to a second wireless device indicating which of multiple channels are sensed as free by the first device. The second device may reply with an MCTS that indicates which of those free channels are also sensed as free by the second device. After this MRTS/MCTS exchange, the first device will have a list of available channels that are sensed as free by both devices, and the hidden node problem may thereby be avoided in a subsequent multi-channel communication by using only those channels that are sensed as free by both devices.

FIG. 1 shows wireless devices communicating with each other in a wireless communications network, according to an embodiment of the invention. In the illustrated example, one device is shown as a network controller (NC), while the devices communicating with it are shown as mobile devices (MD1, MD2), but in some networks devices may communicate with each others in a peer relationship. Although only two MDs are shown, in some embodiments there may be additional MD's in the network that are also able to communicate with the NC.

Figure 2:
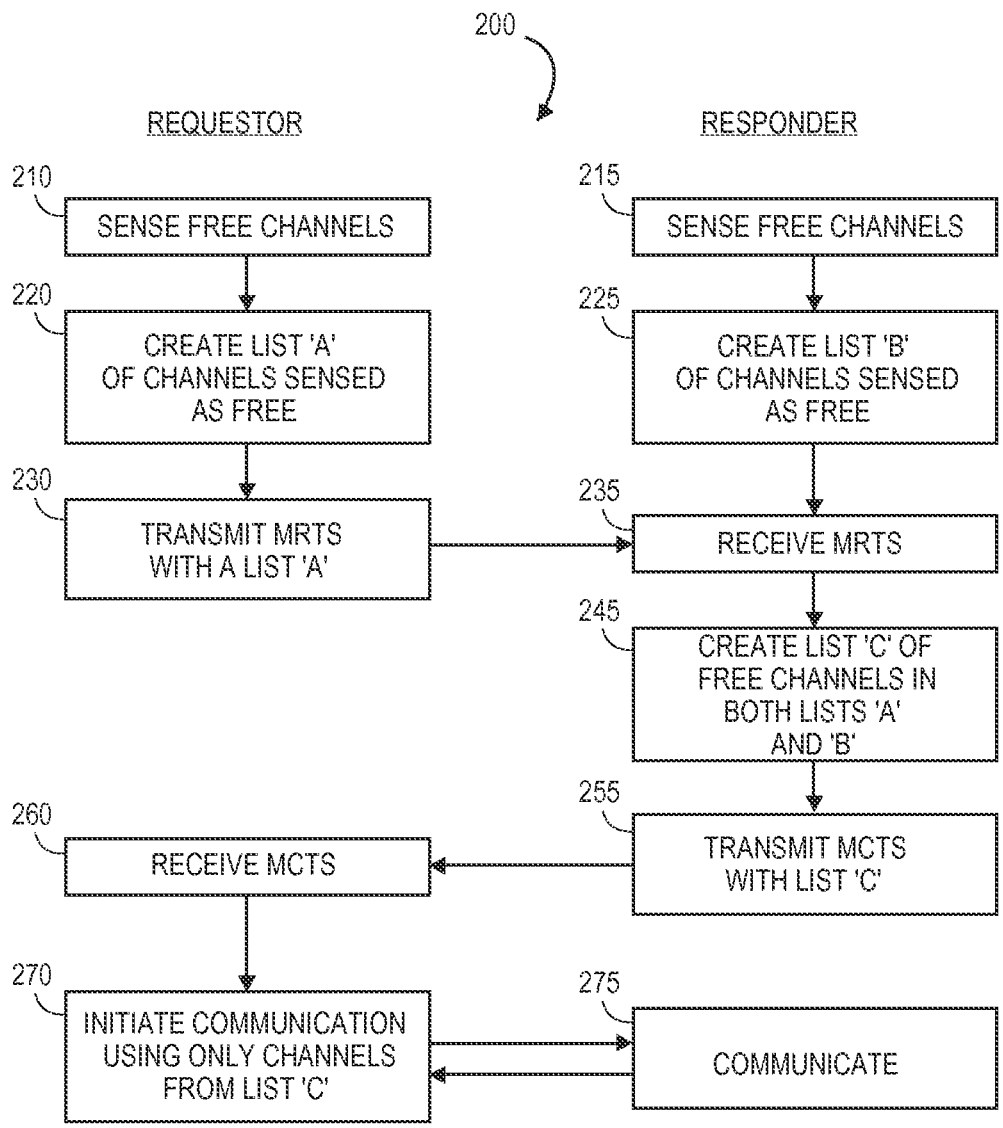
FIG. 2 shows a flow diagram of communications between two devices, according to an embodiment of the invention.

FIG. 2 shows a flow diagram of communications between two devices, according to an embodiment of the invention. In flow diagram 200, the two devices are labeled as a requestor and a responder. Each device may transmit and receive at different times during the exchange. For this document, the device that requests the communication (by transmitting an MRTS) is called the requestor, and the device that responds to that request (by transmitting an MCTS) is called the responder. In some instances, the responder may deny the request (e.g., by not responding, by indicating no channels are free, or by any other feasible means), but the description here assumes that the responder accepts the request. In some embodiments the requestor may be an MD and the responder may be an NC, but in other embodiments those roles are reversed, and in some other embodiments both devices may be peer devices.

At 210 the requestor may sense the various channels that are available to it to determine which channels are currently free. In some embodiments this may happen during a 'contention' period in the network during which the devices are allowed to contend for the medium. At 220 the requestor may make a list (e.g., list A) of the channels that are currently free, and at 230 it may transmit this list to the responder in an MRTS. The list may take any feasible form, and it may be represented in the MRTS in any feasible manner. Possible formats are discussed later in more detail. In some instances, for various reasons, the requestor may limit this list to a subset of the channels that were sensed as being free. For the purposes of this description, the list of free channels is the list of channels indicated by the MRTS as being free, even if more channels could have been included in the list.

In the meantime, at 215 the responder may also sense the various channels that are available to it to determine which channels are currently free. In many instances, the 'available channels' will be the same for both devices, but sometimes this may not be the case. At 225 the responder may make a list (e.g., list B) of the channels that are currently free, and at 235 it may receive the MRTS that was transmitted by the requestor.

In some embodiments, a device may frequently monitor the various available channels and keep an ongoing list of which channels are free. This technique is implied by the order of operations shown in FIG. 2. In other embodiments, a device may not examine the channels in this way until it needs to know that information. For example, the requestor may not sense the channels until it determines that it is going to transmit something (e.g., the MRTS), and the responder may not sense the channels until it receives the MRTS. This choice may depend largely on how quickly that information must be obtained. If the responder must begin transmitting its respond within a few microseconds, but it takes a few hundred microseconds to sense whether the channels are free, then previous scanning of the channels may be preferable.

After receiving the MRTS, the responder may compare its own list B with list A, and produce a list C that lists only the channels that were indicated as free in both list A and list B. List C thus represents the channels that were determined to be free at both the requestor and the responder locations. At 255, list C may then be transmitted back to the requestor in an MCTS, which the requestor receives at 260. Now that the requestor has a list of channels that are deemed free by both devices, at 270 the requestor may initiate a communication with the responder that takes place at 270 and 275, using only channels that are contained in list C. All or only some of the channels in list C may be selected for this communication, and the selection may be changed during the communication. In some embodiments, each device may select which of the channels from list C are to be used in the current transmission. Any feasible technique may be used to notify the receiving device of which channels are being selected by the transmitting device.

Although described as a 'list', the indication of which channels were sensed as free may be formatted in any feasible manner. In one embodiment, a bitmap may be used in which each available channel is represented by a bit in the bitmap, and the state of each bit indicates whether the associated channel is free or not. This bitmap may then be placed into a particular field in the MRTS and/or MCTS. Other embodiments may use any other feasible formatting technique to convey this information.

FIG. 3 shows the format of an MRTS, according to an embodiment of the invention. In the illustrated embodiments of FIG. 3, the MRTS is formatted as a control frame. The contents of the Frame Control field may indicate it is an MRTS. The contents of the Duration field may indicate how long the current exchange of information is expected to take, which may include the current MRTS frame, the responding MCTS frame, an ACK frame, and a predetermined number of interframe spacing (IFS) delays. This value may serve as a reservation notice to other devices that can receive it that the channel is to be reserved for the indicated time period, and those other devices should reframe from transmitting during that time (other than the device addressed by this frame as the intended receiver).

The contents of the RA field may indicate the address of the receiving device, i.e., the responder device for whom this MRTS is intended. Similarly, the TA field may indicate the address of the transmitting device, i.e., the requestor device that is transmitting this MRTS. The Channel Bitmap field may contain list A, that is, the channels that are designated by the transmitting device as being free. The FCS field may contain a frame checksum value to verify that the frame as received was not corrupted.

FIG. 4 shows the format of an MCTS, according to an embodiment of the invention. In the illustrated embodiments of FIG. 4, the MCTS is also formatted as a control frame. The contents of the Frame Control field may indicate it is an MCTS. The contents of the Duration field may indicate how long the remainder of the current exchange of information is expected to take, which may include the current MCTS frame, an ACK frame, and a predetermined number of inter-frame spacing (IFS) delays. As with the MRTS, this value may serve as a reservation notice to other devices that can receive it that the channel is to be reserved for the indicated time period, and those other devices should reframe from transmitting during that time (other than the requestor device addressed by this frame as the intended receiver).

Because of physical distances, obstructions, localized interferences, etc., the set of devices that can receive the MCTS frame may be different than the set of devices that can receive the MRTS frame, so both sets of devices may be notified of how long to refrain from transmitting by reading the contents of the Duration field from whichever transmission it can receive. For those devices that can receive both, the MCTS Duration field may be used to verify or update the value previously obtained from the MRTS Duration field.

The contents of the RA field may indicate the address of the receiving device, i.e., the requestor device for whom this MCTS is intended. Since only the device addressed in the MRTS should respond with an MCTS, there may be no TA field—the receiving device may simply assume that the device responding to the MRTS is the same device that was indicated by the RA field in the MRTS. The Channel Bitmap field may contain list C, that is, the list A channels that were also sensed as being free by the responder. As before, the FCS field may contain a frame checksum value to verify that the frame as received was not corrupted.

These example formats were shown because they closely conform to the overall RTS and CTS formats that are already in use for single channel operation (except of course for the Channel Bitmap field). But this free-channel information may be transmitted in any convenient format and still fall within the scope of various embodiments of the invention.

Figure 5:
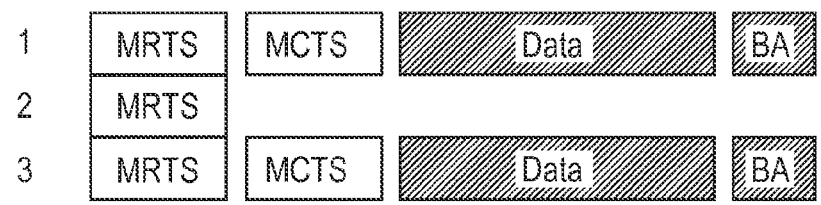
FIG. 5 shows a communication sequence, according to an embodiment of the invention.

FIG. 5 shows a communication sequence, according to an embodiment of the invention. In the example of FIG. 5, the requestor may transmit an MRTS listing 3 channels as free, and the MRTS may be simultaneously transmitted over each of those three channels (shown as channels 1, 2 and 3, although they may be identified in any feasible way). The responder may determine that channels 1 and 3 are free while channel 2 is busy, so it may transmit an MCTS showing only channels 1 and 3 are free, and it may simultaneously transmit that MCTS over channels 1 and 3. Now that the requestor has the list of channels that are free at both locations, it may begin transmitting the data to the responder over channels 1 and 3, and the responder may transmit an acknowledgement BA over both of those channels to indicate that the data was received correctly on both channels.

Figure 6:
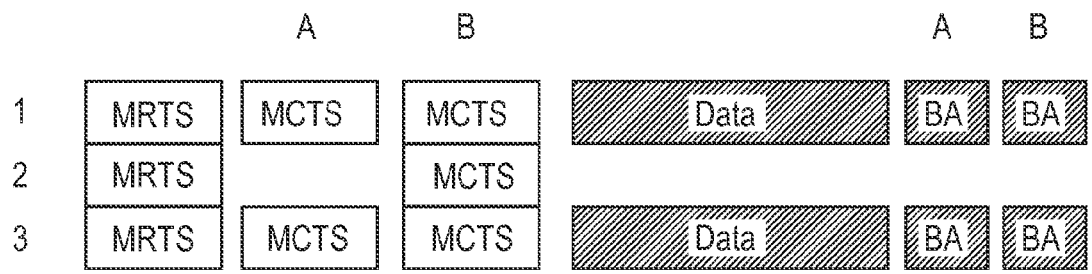
FIG. 6 shows a communication sequence involving multiple responders, according to an embodiment of the invention.

FIG. 6 shows a communication sequence involving multiple responders, according to an embodiment of the invention. In some networks, the requestor may want to transmit data to multiple responders in the same communications sequence, and the MRTS may therefore be addressed to multiple responders. Such multiple addressing may be handled in various ways, such as but not limited to multicast addressing. To keep from interfering with each other, the responders may transmit their MCTS's at different times.

In the example shown, the requestor senses that channels 1, 2, and 3 are free, and transmits an MRTS to responders A and B on each of channels 1, 2, and 3. If Responder A senses that only channels 1 and 3 are free, or correctly receives the MRTS only on channels 1 and 3, the Responder A transmits an MCTS indicating that channels 1 and 3 are free on each of channels 1 and 3. Responder B senses that channels 1, 2, and 3 are all free, and transmits an MCTS indicating that on each of channels 1, 2, and 3. The requestor now knows that transmitting the data on channel 2 would be acceptable at responder B, but it might cause interference at responder A. So it transmits the data to both responders only on channels 1 and 3. As with the MCTS's, each responder may transmit its acknowledgement BA's at a different time.

In some embodiments, a particular channel called the primary channel must be used in every multi-channel communication. In this situation, the primary channel must be used when transmitting the MRTS, the MCTS, and the subsequent data. Therefore, if the primary channel is sensed as busy by the requestor, the MRTS may not be transmitted. If the primary channel is sensed as busy by the responder the MCTS and the subsequent data may not be transmitted.

In some networks, the devices may communicate using multi-user multiple input multiple output (MU MIMO), in which different "spatial channels" may be used to transmit different signals to different devices over the same frequency channel, without interference. (In this document, the term 'channel' is assumed to mean a frequency channel unless specifically identified as a spatial channel.) In such cases, each spatial channel may use the techniques previously described, without concern for whether the same channels are simultaneously being used on another spatial channel.

As previously implied, one purpose of the MRTS and MCTS frames is to notify non-participating devices (devices that are neither the requestor nor the responders) that certain channels are being reserved for a specified period of time, and those non-participating devices should refrain from transmitting on those channels during that time. The Duration field in both the MRTS and MCTS serve that purpose, and when a non-participating device receives one of those frames it can set it's network allocation vector (NAV) to a certain time to let it know not to transmit on the indicated channel(s) during that time. If it is able to receive the MCTS, it can use the list in the MCTS duration field as the indicator of which channels to avoid since the requestor will be guided by that list for subsequent transmissions rather than by the potentially-larger MRTS list.

However, some non-participating devices may be able to receive the MRTS but not the MCTS. Such a device might set it's NAV for a channel that is not going to be used because the responder sensed it as busy when the requestor did not. To avoid unnecessarily avoiding a channel that it could otherwise use, a non-participating device may follow the practice of potentially resetting its NAV after a certain time period if the NAV was set based on an MRTS but the corresponding MCTS was not received. This time period may be long enough to receive any CTS, but not long enough to wait for the entire Data transmission period. In one embodiment, the time to wait may be expressed as:

$$(2\ \text{SIFSTimes}) + (\text{TXTIMEMCTS}) + (\text{PHY-RX-START Delay}) + (2\ \text{slot times})$$

where SIFSTime is the duration of a short interframe space, TXTIMEMCTS is the time to transmit the MCTS, PHY-RX-START Delay is a required delay to wait before receiving, and the slot times are predefined. Whichever delay formula is used, it should be at least long enough to reach the Data phase. If the medium is busy after that delay period, then the device may assume the original duration period obtained from the MRTS is still valid, and not reset its NAV.

The foregoing description is intended to be illustrative and not limiting. Variations will occur to those of skill in the art. Those variations are intended to be included in the various embodiments of the invention, which are limited only by the scope of the following claims.

What is claimed is:

1. A method of operating in a wireless communication network comprising:
   transmitting from a transmitting device to a receiver a request-to-send (RTS) that requests a reservation for multiple channels sensed as free by the transmitting device, wherein:
   the RTS is formatted as a control frame that includes:
      a Frame Control Field indicating the RTS;
      a Duration field indicating a time period during which devices other than the receiver should refrain from transmitting;
      a RA field indicating an address of the receiver;
      a TA field indicating an address of the transmitting device;
      a Frame Check Sequence (FCS) field;
   the RTS further indicating the channels sensed as free by the transmitting device;
   receiving from the receiver a clear-to-send (CTS) indicating one or more channels sensed as free by the receiver that are a subset of the channels sensed as free by the transmitting device;
   transmitting to the receiver only on the one or more channels.

2. The method of claim 1, wherein the multiple channels include a primary channel, and wherein transmitting to the receiver includes transmitting on the primary channel.

3. The method of claim 1, wherein the control frame of the RTS includes a Channel Bitmap field containing a list of the channels sensed as free by the transmitting device.

4. The method of claim 1, wherein transmitting to the receiver includes using multi-user multiple input multiple output (MU-MIMO).

5. The method of claim 1, further including sensing the multiple channels by the transmitting device to determine the channels sensed as free by the transmitting device only when the transmitting device is going to transmit.

6. A method of operating in a wireless communication network comprising:
   receiving at a receiver from a transmitting device a request-to-send (RTS) that requests a reservation for multiple channels sensed as free by the transmitting device;
   transmitting from the receiver a clear-to-send (CTS) that indicates one or more channels sensed as free by the receiver that are a subset of the channels sensed as free by the transmitting device, wherein the CTS is formatted as a control frame and includes:
      a Frame Control Field indicating the CTS;
      a Duration field indicating a time period during which devices other than the receiver should refrain from transmitting;
      a RA field indicating an address of the transmitting device;
      a Frame Check Sequence (FCS) field;
   receiving from the transmitting device only on the one or more channels.

7. The method of claim 6, wherein the multiple channels include a primary channel, and wherein receiving from the transmitting device includes receiving on the primary channel.

8. The method of claim 6, wherein the control frame of the CTS includes a Channel Bitmap field containing a list of the one or more channels sensed as free by the receiver.

9. The method of claim 6, wherein receiving includes receiving a multi-user multiple input multiple output (MU-MIMO) transmission.

10. The method of claim 6, further including sensing the multiple channels by the receiver to determine the one or more channels sensed as free by the receiver only after receiving the RTS.

11. A transmitting device to operate in a wireless network and including a processor, a memory, a radio and one or more antennas, the transmitting device to:
   transmit to a receiver a request-to-send (RTS) that requests a reservation for multiple channels sensed as free by the transmitting device, wherein:
   the RTS is formatted as a control frame that includes:
      a Frame Control Field indicating the RTS;
      a Duration field indicating a time period during which devices other than the receiver should refrain from transmitting;
      a RA field indicating an address of the receiver;
      a TA field indicating an address of the transmitting device;
      a Frame Check Sequence (FCS) field;
   the RTS further indicating the channels sensed as free by the transmitting device;
   receive from the receiver a clear-to-send (CTS) indicating one or more channels sensed as free by the receiver that are a subset of the channels sensed as free by the transmitting device;
   transmit to the receiver only on the one or more channels.

12. The transmitting device of claim 11, wherein the multiple channels include a primary channel, and wherein the transmitter is to transmit to the receiver on the primary channel.

13. The transmitting device of claim 11, wherein the control frame of the RTS includes a Channel Bitmap field containing a list of the channels sensed as free by the transmitting device.

14. The transmitting device of claim 11, wherein the transmitting device is to transmit using multi-user multiple input multiple output (MU-MIMO).

15. The transmitting device of claim 11, wherein the transmitting device is to sense the multiple channels to determine the channels sensed as free by the transmitting device only when the transmitting device is going to transmit.

16. A receiver to operate in a wireless communication network and comprising a processor, a memory, a radio and one or more antennas, the receiver to:
   receive from a transmitting device a request-to-send (RTS) that requests a reservation for multiple channels sensed as free by the transmitting device;

transmit from the receiver a clear-to-send (CTS) that indicates one or more channels sensed as free by the receiver that are a subset of the channels sensed as free by the transmitting device, wherein the CTS is formatted as a control frame and includes:
- a Frame Control Field indicating the CTS;
- a Duration field indicating a time period during which devices other than the receiver should refrain from transmitting;
- a RA field indicating an address of the transmitting device;
- a Frame Check Sequence (FCS) field;

receive from the transmitting device only on the one or more channels.

17. The receiver of claim 16, wherein the multiple channels include a primary channel, and wherein the receiver is to receive from the transmitting device on the primary channel.

18. The receiver of claim 16, wherein the control frame of the CTS includes a Channel Bitmap field containing a list of the one or more channels sensed as free by the receiver.

19. The receiver of claim 16, wherein the receiver is to receive a multi-user multiple input multiple output (MU-MIMO) transmission.

20. The receiver of claim 16, wherein the receiver is to sense the multiple channels to determine the one or more channels sensed as free by the receiver only after receiving the RTS.

21. A non-transitory tangible computer-readable medium storing information which, when read and executed by one or more processors, enables performance of operations including:

transmitting from a transmitting device to a receiver a request-to-send (RTS) that requests a reservation for multiple channels sensed as free by the transmitting device, wherein:
the RTS is formatted as a control frame that includes:
- a Frame Control Field indicating the RTS;
- a Duration field indicating a time period during which devices other than the receiver should refrain from transmitting;
- a RA field indicating an address of the receiver;
- a TA field indicating an address of the transmitting device;
- a Frame Check Sequence (FCS) field;

the RTS further indicating the channels sensed as free by the transmitting device;
receiving from the receiver a clear-to-send (CTS) indicating one or more channels sensed as free by the receiver that are a subset of the channels sensed as free by the transmitting device;
transmitting to the receiver only on the one or more channels.

22. The computer-readable medium of claim 21, wherein the multiple channels include a primary channel, and wherein transmitting to the receiver includes transmitting on the primary channel.

23. The computer-readable medium of claim 21, wherein the control frame of the RTS includes a Channel Bitmap field containing a list of the channels sensed as free by the transmitting device.

24. The computer-readable medium of claim 21, wherein transmitting includes using multi-user multiple input multiple output (MU-MIMO).

25. The computer-readable medium of claim 21, wherein the operations further include sensing the multiple channels by the transmitting device to determine the channels sensed as free by the transmitting device only when the transmitting device is going to transmit.

26. A non-transitory tangible computer-readable medium storing information which, when read and executed by one or more processors, enables performance of operations including:

receiving at a receiver from a transmitting device a request-to-send (RTS) that requests a reservation for multiple channels sensed as free by the transmitting device;
transmitting from the receiver a clear-to-send (CTS) that indicates one or more channels sensed as free by the receiver that are a subset of the channels sensed as free by the transmitting device, wherein the CTS is formatted as a control frame and includes:
- a Frame Control Field indicating the CTS;
- a Duration field indicating a time period during which devices other than the receiver should refrain from transmitting;
- a RA field indicating an address of the transmitting device;
- a Frame Check Sequence (FCS) field;

receiving from the transmitting device only on the one or more channels.

27. The computer-readable medium of claim 26, wherein the multiple channels include a primary channel, and wherein receiving from the transmitting device includes receiving on the primary channel.

28. The computer-readable medium of claim 26, wherein the control frame of the CTS includes a Channel Bitmap field containing a list of the one or more channels sensed as free by the receiver.

29. The computer-readable medium of claim 26, wherein receiving includes receiving a multi-user multiple input multiple output (MU-MIMO) transmission.

30. The computer-readable medium of claim 26, wherein the operations further include sensing the multiple channels by the receiver to determine the one or more channels sensed as free by the receiver only after receiving the RTS.

31. A method of operating in a wireless communication network comprising:

transmitting from a transmitting device to a receiver a request-to-send (RTS) formatted as a control frame that includes:
- a Frame Control Field indicating the RTS;
- a Duration field indicating a time period during which devices other than the receiver should refrain from transmitting;
- a RA field indicating an address of the receiver;
- a TA field indicating an address of the transmitting device;
- a Frame Check Sequence (FCS) field; and
- a Channel Bitmap field containing a list of multiple channels sensed as free by the transmitting device; and receiving from the receiver a clear-to-send (CTS).

32. The method of claim 31, wherein the multiple channels include a primary channel, and wherein transmitting to the receiver includes transmitting on the primary channel.

33. The method of claim 31, wherein transmitting includes using multi-user multiple input multiple output (MU-MIMO).

34. The method of claim 31, further including sensing the multiple channels by the transmitting device to determine the channels sensed as free by the transmitting device only when the transmitting device is going to transmit.

35. A transmitting device to operate in a wireless network and including:
- a processor, a memory, a radio and one or more antennas;
- the transmitting device to:
  - transmit to a receiver a request-to-send (RTS) formatted as a control frame that includes:
    - a Frame Control Field indicating the RTS;
    - a Duration field indicating a time period during which devices other than the receiver should refrain from transmitting;
    - a RA field indicating an address of the receiver;
    - a TA field indicating an address of the transmitting device;
    - a Frame Check Sequence (FCS) field; and
    - a Channel Bitmap field containing a list of multiple channels sensed as free by the transmitting device; and
  - receive from the receiver a clear-to-send (CTS).

36. The transmitting device of claim 35, wherein the multiple channels include a primary channel, and wherein the transmitter is to transmit to the receiver on the primary channel.

37. The transmitting device of claim 35, wherein the transmitting device is to transmit using multi-user multiple input multiple output (MU-MIMO).

38. The transmitting device of claim 35, wherein the transmitting device is to sense the multiple channels to determine the channels sensed as free by the transmitting device only when the transmitting device is going to transmit.

39. A non-transitory tangible computer-readable medium storing information which, when read and executed by one or more processors, enables performance of operations including:
- transmitting from a transmitting device to a receiver a request-to-send (RTS) formatted as a control frame that includes:
  - a Frame Control Field indicating the RTS;
  - a Duration field indicating a time period during which devices other than the receiver should refrain from transmitting;
  - a RA field indicating an address of the receiver;
  - a TA field indicating an address of the transmitting device;
  - a Frame Check Sequence (FCS) field; and
  - a Channel Bitmap field containing a list of multiple channels sensed as free by the transmitting device; and
- receiving from the receiver a clear-to-send (CTS).

40. The computer-readable medium of claim 39, wherein the multiple channels include a primary channel, and wherein transmitting to the receiver includes transmitting on the primary channel.

41. The computer-readable medium of claim 39, wherein transmitting includes using multi-user multiple input multiple output (MU-MIMO).

42. The computer-readable medium of claim 39, wherein the operations further include sensing the multiple channels by the transmitting device to determine the channels sensed as free by the transmitting device only when the transmitting device is going to transmit.

\* \* \* \* \*